(12) United States Patent
Andre et al.

(10) Patent No.: US 11,827,090 B2
(45) Date of Patent: Nov. 28, 2023

(54) DEVICE FOR REGULATING AN AIR STREAM FOR AN AIR INLET OF A MOTOR VEHICLE

(71) Applicant: Valeo Systemes Thermiques, Le Mesnil-Saint-Denis (FR)

(72) Inventors: Stephan Andre, Le Mesnil Saint Denis (FR); Jerome Ripa, Le Mesnil Saint Denis (FR); Pierre Alexandre Langlet, Le Mesnil Saint Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 226 days.

(21) Appl. No.: 17/273,513

(22) PCT Filed: Aug. 14, 2019

(86) PCT No.: PCT/FR2019/051924
§ 371 (c)(1),
(2) Date: Mar. 4, 2021

(87) PCT Pub. No.: WO2020/049236
PCT Pub. Date: Mar. 12, 2020

(65) Prior Publication Data
US 2021/0339622 A1   Nov. 4, 2021

(30) Foreign Application Priority Data
Sep. 7, 2018 (FR) .................................... 1858034

(51) Int. Cl.
*B60K 11/00* (2006.01)
*B60K 11/08* (2006.01)
*B60K 11/06* (2006.01)

(52) U.S. Cl.
CPC ............ *B60K 11/085* (2013.01); *B60K 11/06* (2013.01)

(58) Field of Classification Search
CPC .............................. B60K 11/085; B60K 11/08
(Continued)

(56) References Cited

U.S. PATENT DOCUMENTS 4,164,262 A * 8/1979 Skatsche ................ B60K 11/04
180/69.1
5,165,251 A * 11/1992 Tsukamoto ........... F16L 55/033
285/192

(Continued)

FOREIGN PATENT DOCUMENTS

| CN | 102452293 A | 5/2012 |
| CN | 102826004 A | 12/2012 |

(Continued)

OTHER PUBLICATIONS

Office Action issued in European Application No. 19769845.9, dated Aug. 18, 2022 (5 pages).

(Continued)

*Primary Examiner* — Hau V Phan
(74) *Attorney, Agent, or Firm* — Osha Bergman Watanabe & Burton LLP (57) ABSTRACT

The invention relates to a device (I) for regulating an air stream for an air inlet of a motor vehicle, comprising a housing (2) defining a flow duct (4), in which an air stream flows, in which a cooling unit (6) is at least partially arranged, comprising at least one heat exchanger (8, IO) and a motorized fan unit (12). According to the invention, the housing (2) comprises a sealing means (64, 64a, 64b, 64c) for preventing any air leakage outside the flow duct (4). The invention also relates to a motor vehicle comprising such a regulating device (I).

9 Claims, 4 Drawing Sheets

(58) Field of Classification Search
USPC .......................................................... 180/68.5
See application file for complete search history.

(56) References Cited

U.S. PATENT DOCUMENTS

| | | | | |
|---|---|---|---|---|
| 7,022,008 | B1 * | 4/2006 | Crocker | B60H 1/242 237/12.3 B |
| 8,479,853 | B2 * | 7/2013 | Verbrugge | F01P 11/10 180/68.2 |
| 9,744,848 | B2 * | 8/2017 | Ho | B60K 11/085 |
| 2009/0302544 | A1 * | 12/2009 | Pugh, Jr. | F24F 13/082 277/637 |
| 2012/0024611 | A1 * | 2/2012 | Ajisaka | B60K 11/08 180/68.1 |
| 2013/0059519 | A1 * | 3/2013 | Tajima | B60K 11/04 454/152 |
| 2013/0081888 | A1 * | 4/2013 | Charnesky | B60K 11/08 180/68.3 |
| 2013/0133963 | A1 * | 5/2013 | Ajisaka | B60K 11/04 180/68.1 |
| 2013/0240284 | A1 * | 9/2013 | Ajisaka | F01N 3/2046 180/309 |
| 2014/0138077 | A1 * | 5/2014 | Ajisaka | B60H 1/00021 165/41 |
| 2014/0299396 | A1 * | 10/2014 | Tajima | B62D 35/02 180/68.1 |
| 2015/0068825 | A1 | 3/2015 | Berthevas et al. | |
| 2016/0096424 | A1 * | 4/2016 | Schiller | B60K 11/04 180/68.1 |
| 2019/0210451 | A1 * | 7/2019 | Parra | B60K 11/085 |
| 2021/0101470 | A1 * | 4/2021 | Gerber | B60K 11/085 |

FOREIGN PATENT DOCUMENTS

| | | |
|---|---|---|
| CN | 105966231 A | 9/2016 |
| DE | 102008020399 A1 | 10/2009 |
| EP | 1216872 A1 | 6/2002 |
| EP | 2402574 A1 | 1/2012 |
| FR | 2950574 A1 | 4/2011 |
| FR | 3013302 A1 | 5/2015 |

OTHER PUBLICATIONS

International Search Report with Written Opinion in corresponding International Application No. PCT/FR2019/051924, dated Nov. 8, 2019 (12 pages).
Office Action Issued in Corresponding CN Application No. 201980058509.2, dated Sep. 26, 2023. (8 Pages).

* cited by examiner

DEVICE FOR REGULATING AN AIR STREAM FOR AN AIR INLET OF A MOTOR VEHICLE

The invention relates to a device for regulating an air stream for an air inlet of a motor vehicle and more specifically as well as to a motor vehicle, and in particular an electric motor vehicle comprising such an air inlet regulation device.

Generally, a motor vehicle comprises an air inlet that takes the form of an opening situated on the front face of said motor vehicle. The incoming air is used to enable a heat exchange between it and the cooling system of the motor vehicle, said cooling system being situated near the front face of said vehicle. More specifically, the air that enters the engine compartment of the motor vehicle is guided to the cooling system of said motor vehicle to enable a heat exchange between the incoming air and the heat exchanger of the cooling system. It is important to minimize the losses of the air stream between the air inlet and the heat exchanger. Specifically, any air stream entering the inside of the vehicle, and escaping to the engine compartment before it has contributed to the heat exchange inside the motor vehicle, has a negative influence on the air resistance coefficient of said motor vehicle.

It is known practice to use air guides that take the form of a housing generally made from plastic or another flexible material connecting the air inlet to the cooling system.

In the context of an electric vehicle, the air inlet regulation device can comprise an air duct arranged downstream of the cooling system and designed to guide the air stream to the outside of the vehicle. Such a duct can be advantageous for generating a Venturi effect downstream of the cooling unit so that a greater air flow rate can pass through the cooling system, thus improving the thermal efficiency.

Such a duct does however have certain drawbacks. Specifically, ducts as known from the prior art have relatively poor airtightness so air leaks, causing a reduction in the incoming air flow rate, can quickly reduce the thermal performance of the cooling system. In addition, when an electric vehicle is stationary and connected to a station, or electric terminal, in order to recharge the battery, the motor-fan unit of the cooling system is activated in order to cool the battery and prevent it from overheating. However, such operation generates noise annoyance for the user.

The present invention seeks to overcome this disadvantage and proposes a device for regulating an air stream for an air inlet of a motor vehicle, comprising a housing defining a flow duct in which there flows an air stream, in which a cooling unit comprising at least one heat exchanger and a motor-fan unit is at least partially arranged. According to the invention, the housing comprises a sealing means to prevent any air from leaking out of the flow duct. In other words, the regulating device comprises several elements and at least one sealing means is arranged between at least two elements.

The flap makes it possible to shut off the flow duct and in particular the duct conveying the air stream to the outside of the vehicle. The noise annoyance thus generated during battery recharging is contained inside the vehicle and can no longer be perceived outside the vehicle.

Other embodiments of the air inlet regulation device taken individually or in combination propose that:
 the sealing means corresponds to a seal or a strip made of foam, or foam strip;
 the sealing means is airtight and watertight;
 the regulation device comprises a flap arranged within the flow duct downstream of the cooling unit relative to the flow of the air stream;
 the flow duct comprises an inlet and an outlet, said outlet being made up of at least two separate ducts, said device comprising at least one flap being capable of shutting off each of said ducts;
 a shut-off device comprising a set of shut-off flaps capable of pivoting rotatably so that they vary the flow rate of the air stream, is arranged in the flow duct upstream of the cooling unit relative to the flow of the air stream;
 the cooling unit is inclined relative to the shut-off device;
 the cooling unit comprises a support frame in which said at least one heat exchanger and said motor-fan unit are arranged, the housing being fixed to the support frame in such a way that the support frame corresponds to part of the flow duct, a sealing means being arranged between the support frame and the housing;
 the housing comprises a first part arranged upstream of the support frame and a second part arranged downstream of the support frame, sealing means being arranged between the support frame and each part;
 the housing or each part of the housing is made up of two half-housings which together form said flow duct, a sealing means being arranged between each half-housing;
 the flap is of the drum or sliding type;
 the flow duct comprises an inlet and an outlet, said outlet being made up of at least two separate ducts, the flap being capable of shutting off each of said ducts;
 a shut-off device comprising a set of shut-off flaps capable of pivoting rotatably so that they vary the flow rate of the air stream, is arranged in the flow duct upstream of the cooling unit relative to the flow of the air stream;
 the cooling unit is inclined relative to the shut-off device;
 fins are arranged upstream and/or downstream of the cooling unit relative to the flow of the air stream;
 the fins extend from the shut-off device to the cooling unit;
 the flow cross section of the flow duct widens from the inlet to the cooling unit and narrows from the cooling unit to the outlet.

The invention also relates to a vehicle comprising such a device for regulating an air stream for an air inlet according to the invention.

Other embodiments of the vehicle taken individually or in combination propose that:
 the vehicle comprises an air inlet, optionally provided with a grille, the outlet of the flow duct comprises a discharge duct arranged to convey the air stream to the outside of the vehicle and a cooling duct arranged to convey the air stream to the engine compartment of the vehicle;
 the vehicle further comprises an additional air inlet and an additional duct connecting said additional inlet to the discharge duct.

Other features and advantages of the invention will become apparent on reading the following description. This description is purely illustrative and should be read in conjunction with the appended drawings, in which.

Figure 1:
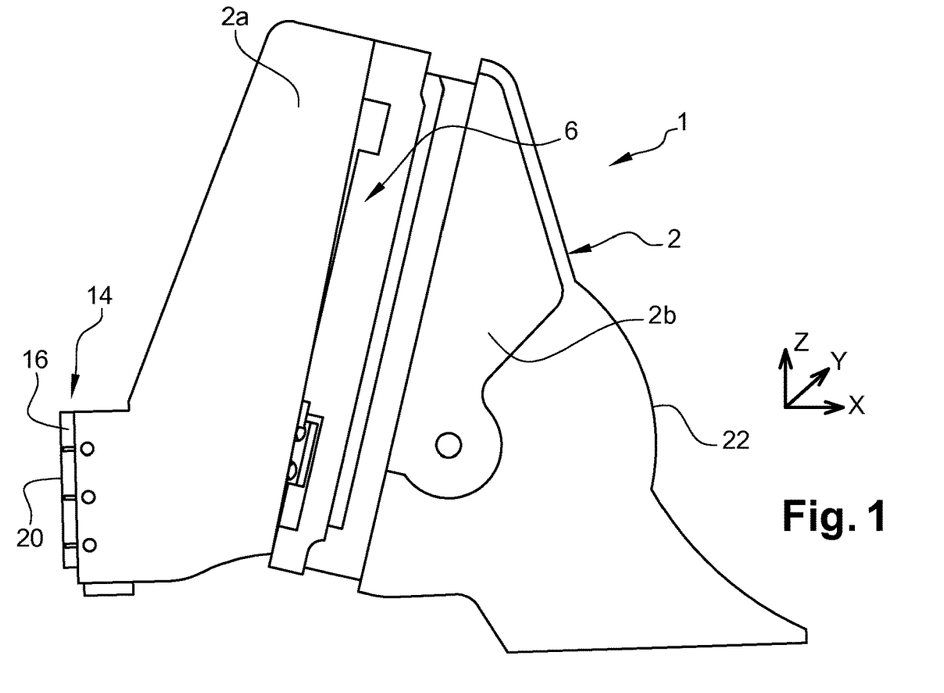
FIG. 1 shows a profile view of a device for regulating an air stream according to the invention.

FIG. 1 shows the device 1 for regulating an air stream for an air inlet of a motor vehicle according to the invention. The regulation device 1 extends in a longitudinal (X), transverse (Y) and vertical (Z) direction, for example relative to the axes of the vehicle, as shown by the axes in FIGS. 1 and 2.

According to the present invention, the terms "downstream", "upstream", "in series" and "parallel" qualify the position of one component with respect to another, in the direction of flow of a stream of air through an air stream regulating device 1 according to the present invention.

The device 1 for regulating an air stream according to the invention comprises a housing 2 corresponding to a shell or else to a sleeve, thus, via its walls, defining a flow duct 4 with an air inlet 20 and an air outlet 22 and in which an air stream flows. The housing 2 is made from a flexible material in order to absorb the vibrations of the vehicle when it is traveling, and from a material strong enough to hold elements such as heat exchangers; certain plastics, for example polypropylene or polyamide-6, lend themselves to such use.

Figure 2:
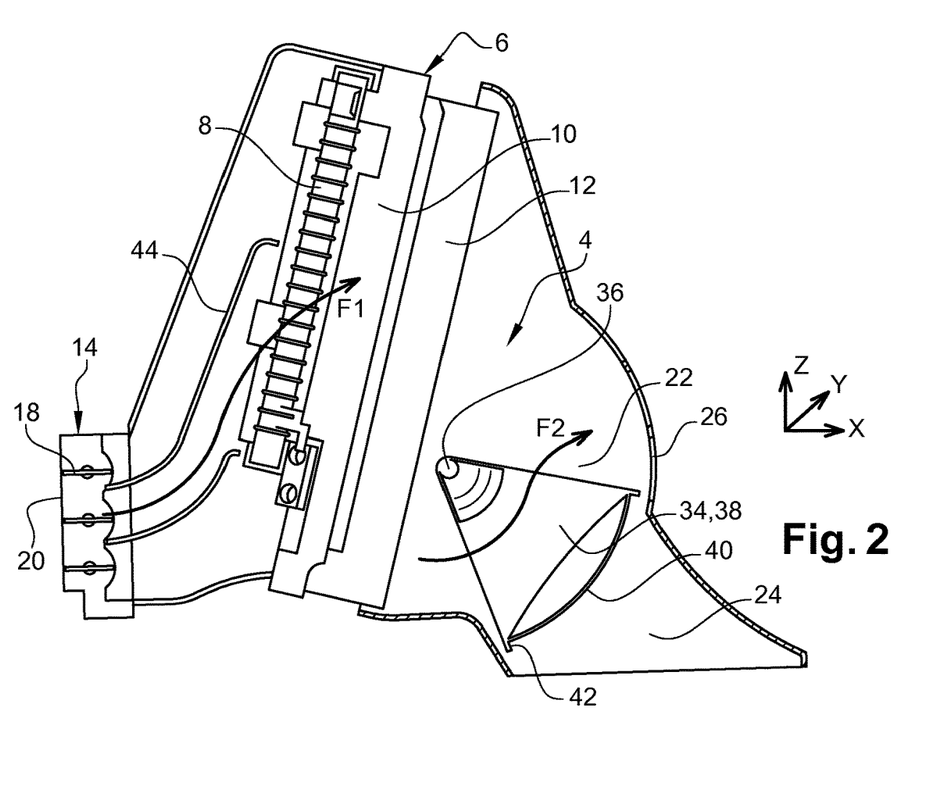
FIG. 2 shows a cross-sectional profile view of the device for regulating an air stream in FIG. 1.

The device 1 for regulating an air stream according to the invention further comprises a cooling unit 6. The cooling unit 6 comprises at least one heat exchanger suitable for allowing a heat exchange between the air stream and the fluid circulating within the heat exchanger. As shown in FIG. 2, the cooling unit 6 here comprises a first and a second heat exchanger 8, 10. The first heat exchanger 8 corresponds for example to a condenser, while the second heat exchanger 10 corresponds for example to a radiator. The cooling unit 6 further comprises a motor-fan unit 12 corresponding to a fan with blades and an associated motor so that it can take in and discharge an air stream through the regulation device 1, even when the vehicle is stationary. The cooling unit 6 also comprises a support frame 62, visible in FIG. 4, corresponding to a rigid structure, more specifically to a rigid plastic frame with four members delimiting a surface within which the heat exchangers 8, 10 and said motor-fan unit 12 are arranged. In order to ensure the continuity of the flow duct 4, the housing 2 is attached to the supporting frame 62 in a sealed fashion. In other words, the supporting frame 62 ensures the continuity of the flow duct 4 or, in other words, the supporting frame 62 corresponds to part of the flow duct 4.

The device 1 for regulating an air stream according to the invention further comprises a shut-off device 14 comprising a set of shut-off flaps 18 capable of pivoting rotatably so that they vary the flow rate of the air stream, said shut-off device 14 being arranged in the flow duct 4 upstream of the cooling unit 6 relative to the flow of the air stream. The shut-off device 14 further comprises a support frame 16 having bearings so as to hold the shut-off flaps 18.

Each shut-off flap 18 comprises an axis of rotation embodied by a journal that is inserted into the bearings of the support frame 16. The axes of rotation allow the shut-off flaps 18 to switch from an open configuration to a closed configuration. The open configuration, or in other words opening a shut-off flap 18, consists of placing (by rotation) the shut-off flaps 18 so that they provide as little opposition as possible to the passage of the air stream while orienting it appropriately. As shown in FIG. 2, in the open configuration, the shut-off flaps 18 are arranged in a horizontal position, in other words they extend in a longitudinal (X) and transverse (Y) direction, and thus ensure a maximum flow rate of the air stream, the air inlet 20 being clear. The closed configuration, or in other words closing a shut-off flap 18, consists of placing the shut-off flaps 18 so that they provide, by means of their front surface, as much opposition as possible to the flow of the air stream F, in conjunction with the other shut-off flaps 18. In this configuration, the shut-off flaps 18 are arranged in a vertical position, in other words they extend in a transverse (Y) and vertical (Z) direction, and thus ensure a minimum or even zero flow rate of the air stream, the air inlet 20 being shut off. Of course, the shut-off flaps 18 are capable of adopting any intermediate position between these two configurations.

Figure 4:
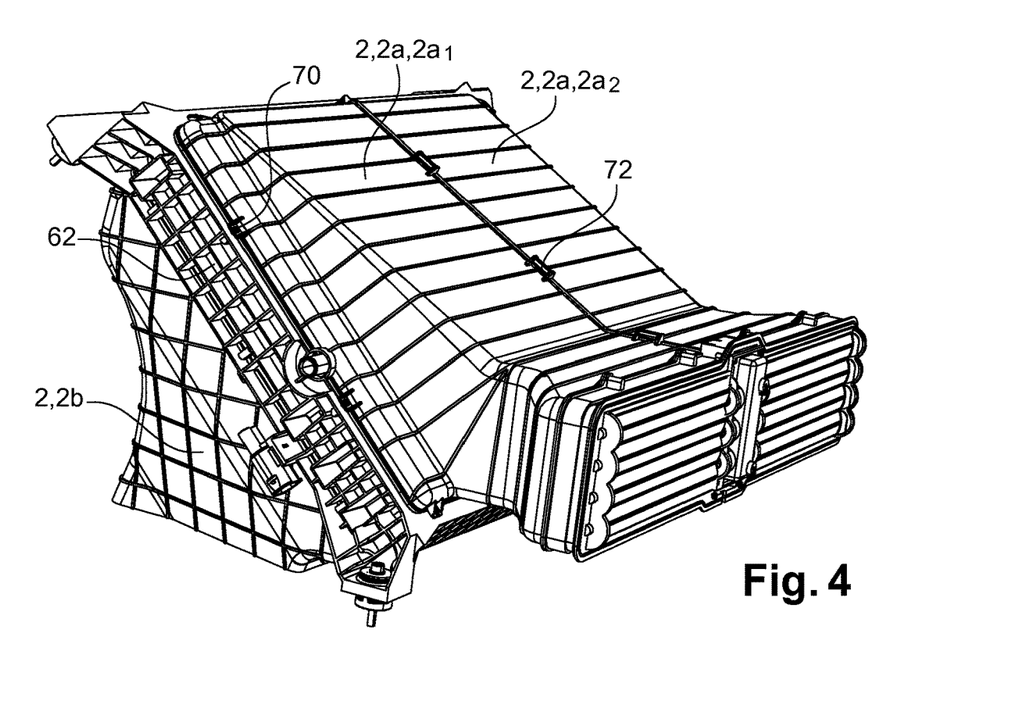
FIG. 4 shows a perspective view of the regulating device according to the invention.

The housing 2 according to the invention, and as illustrated in FIGS. 1 and 4, is made in two parts, a first part $2a$ connecting the inlet of the housing 2, and therefore the air inlet 20 of the flow duct 4, in which the shut-off device 14 is arranged, to the cooling unit 6, notably to the support frame 62, and a second part $2b$ connecting the cooling unit 6 and, more specifically, the support frame 62, to the outlet of the housing 2 and therefore to the air outlet 22 of the flow duct 4. The parts $2a$, $2b$ of the housing comprise fastening means 70 such as clips, hooks, screws with threaded shanks/nuts with tapped holes, bolts, etc. of shapes that complement the fastening means 70 arranged on the support frame 62. It will therefore be appreciated that the support frame 62 provides the continuity of the flow duct 4 between the two parts $2a$, $2b$ of the housing 2.

According to other embodiments, the parts $2a$, $2b$ can also comprise fastening means with complementary shapes so that each part $2a$, $2b$ can be fastened to the other. A housing 2 consisting of a single one-piece part forming continuity of material between the air inlet 20 and the air outlet 22 of the flow duct 4 can also be envisaged.

Figure 3:
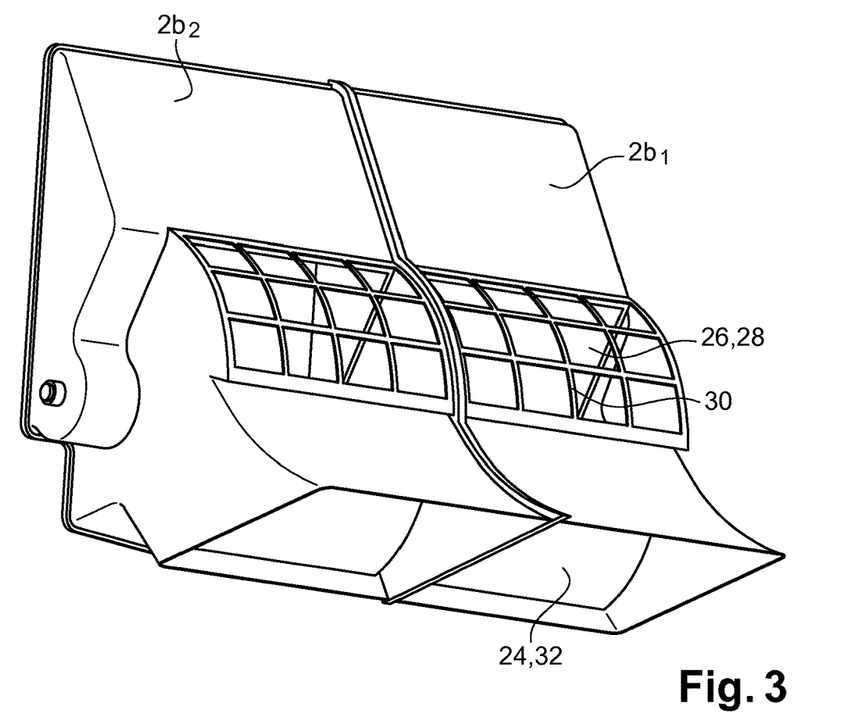
FIG. 3 shows a perspective view of part of the device for regulating an air stream.

The housing 2, and more specifically each part $2a$, $2b$ according to the invention and as illustrated in FIGS. 3 and 4, may comprise two half-housings $2a_1, 2a_2, 2b_1, 2b_2$. Each pair of half-housings $2a_1, 2a_2$, or $2b_1, 2b_2$, together form part of the flow duct 4. In other words, the first pair of half-housings $2a_1, 2a_2$ as illustrated in FIG. 4 constitutes the part $2a$ of the housing 2, namely the part of the flow duct 4 that connects the inlet of the housing 2, notably the air inlet 20 of the flow duct 4, in which the shut-off device 14 is arranged, to the cooling unit 6, notably to the support frame 62. The second pair of half-housings $2b_1, 2b_2$, illustrated in FIG. 3, constitutes the second part $2b$, namely the part of the flow duct 4 that connects the cooling unit 6, and more specifically the support frame 62, to the outlet of the housing 2 and therefore to the air outlet 22 of the flow duct 4. Each pair of half-housings $2a_1, 2a_2$, or $2b_1, 2b_2$ comprises fastening means 72 of complementary shapes, such as clips, in which the female part is arranged on one half-housing $2a_1$ and the male part is arranged on the corresponding other half-housing $2a_2$, or vice versa. These fastening means 72 may be reversible so that the half-housings $2a_1, 2a_2, 2b_1, 2b_2$ are fastened to one another removably, or in other words so that the half-housings $2a_1, 2a_2, 2b_1, 2b_2$ can be taken apart by a reversible connection.

In other words, according to one embodiment, the housing 2 comprises a first part $2a$ connecting an air inlet 20 of the flow duct 4 to the cooling unit 6, the first part $2a$ is made up of two half-housings $2a_1, 2a_2$ which together form said flow duct 4, a sealing means 64, 64a, 64b, 64c being arranged between each half-housing $2a_1, 2a_2$.

Independently of the first part $2a$, the housing 2 comprises a second part $2b$ connecting the cooling unit 6 to the air outlet 22 of the flow duct 4, the second part $2b$ is made up of two half-housings $2b_1, 2b_2$ which together form said flow duct 4, a sealing means 64, 64a, 64b, 64c being arranged between each half-housing $2b_1, 2b_2$.

In summary, the housing 2 comprising a first part 2a arranged upstream of the cooling unit 6 and a second part 2b arranged downstream of the cooling unit 6. In order to provide for a more modular design, the first part 2a is made up of two half-housings $2a_1, 2a_2$ which together form said flow duct 4, a sealing means 64, 64a, 64b, 64c being arranged between each half-housing $2a_1, 2a_2$.

The housing 2 of the air stream regulating device 1 according to the invention comprises at least one sealing means 64 to avoid any leaking of air out of the flow duct 4. In other words, the singular or plural sealing means 64 ensure that the entirety of the air stream passing through the air inlet 20 of the flow duct 4 re-emerges from the flow duct 4 via the air outlet 22. The singular or plural sealing means 64 may be arranged at different points on the regulating device 1. Specifically, each sealing means 64 is arranged at the interface of, which is to say between, two separate elements of the regulating device 1, or in other words, elements that can be taken apart or else which do not have continuity of material. More specifically, in order to provide optimal sealing, the sealing means 64 is arranged on the peripheral perimeter of each separate element that forms part of the flow duct 4. In other words, between two elements that form part of the flow duct 4, a sealing means 64 is arranged on the peripheral connecting surface at the peripheral edges of each of these elements.

The sealing means 64 may therefore be arranged between each half-housing $2a_1, 2a_2$ and $2b_1, 2b_2$, and/or between a part 2a or 2b of the housing 2 and the support frame 62 and/or between each half-housing $2a_1, 2a_2$ and $2b_1, 2b_2$ and the support frame 62. It is also possible to contemplate positioning a sealing means 64 between the housing 2 and the support frame 16 of the shut-off device 14, in the region of the air inlet 20.

Obviously the invention is not restricted to the actual arrangement of the sealing means 64, and the various arrangements mentioned hereinabove can be combined.

Figure 5A:
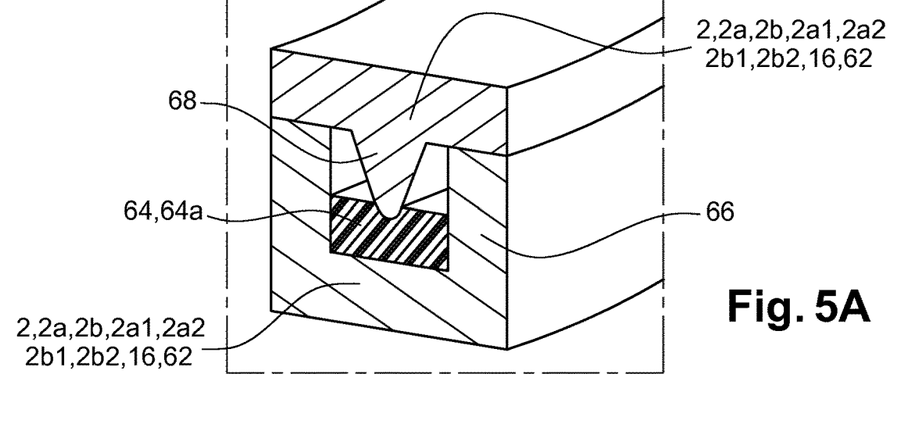
FIGS. 5A-5E show various embodiments of the sealing means.
Figure 5B:
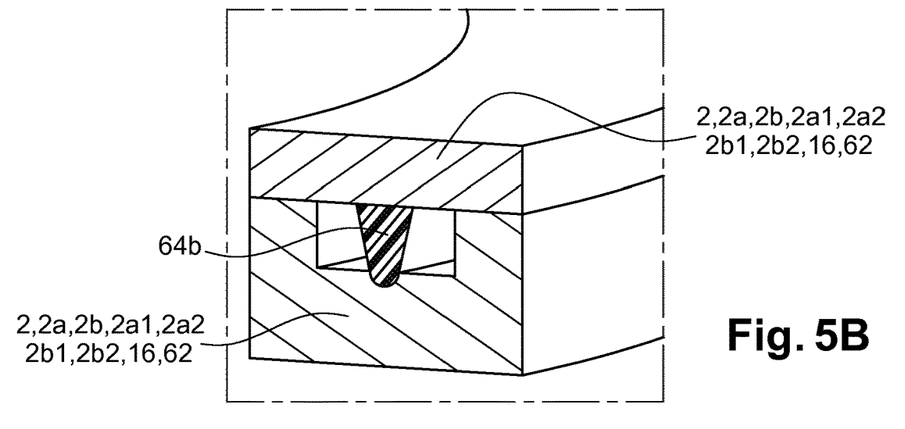

As illustrated in FIGS. 5A to 5E, the sealing means 64 may for example correspond to a seal, more specifically an O-ring 64c (FIG. 5C and FIG. 5E), to a foam strip 64a (FIG. 5A and FIG. 5D) or else to an overmolded elastomer lip seal 64b (FIG. 5B).

The sealing means 64 may be airtight or airtight and watertight.

In order the better to describe the sealing means, the later description relating to FIGS. 5A to 5E incorporates the notion of elements of the regulating device 1. For what follows, it must be understood that these elements correspond to two separate, removable, dissociable elements of the regulating device 1 or else to two elements that are assembled with one another using a reversible connection. These elements include the housing 2, each part 2a, 2b of the housing 2, each half-housing $2a_1, 2a_2, 2b_1, 2b_2$, the support frame 16 for the shut-off device 14 or else the support frame 62, without distinction or particular limitation.

As illustrated in FIG. 5A, the sealing means 64 may correspond to a foam strip 64a arranged at the interface between two elements 2, 2a, 2b, 2a1, 2a2, 2b1, 2b2, 16, 62 of the regulating device. For that, one of these elements, let us say the first element, may comprise a groove 66 in which the foam strip 64b is arranged and the other element, let us say the second element, may comprise a protuberance 68 extending into the groove 66, namely toward the bottom wall of the groove 66, and thus come to bear against the foam strip 64a, the foam strip 64a becoming deformed in such a way as to remain in contact with the protuberance 68, so that the air stream can no longer pass across this collaboration. The foam strip 64a, which may be a polyurethane foam, is particularly well suited to sealing against air only.

Figure 5C:
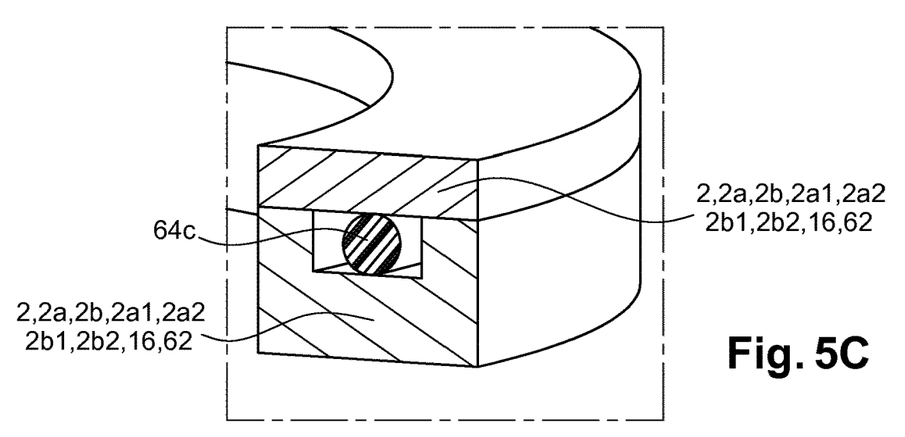
Figure 5D:
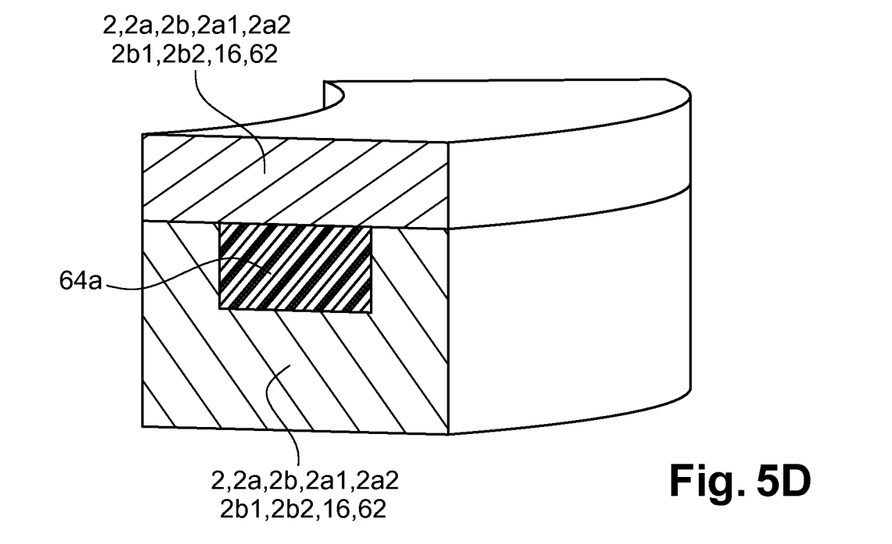

In a variant illustrated in FIG. 5D, the foam strip 64a is arranged at the interface between two elements 2, 2a, 2b, 2a1, 2a2, 2b1, 2b2, 16, 62 of the regulating device 1 in a groove 66 present on the first element, and the second element comes to bear directly against the foam strip 64a without a protuberance, the foam strip 64a deforms in such a way as to remain in contact with the second element 2, 2a, 2b, 2a1, 2a2, 2b1, 2b2, 16, 62 and the air stream is no longer able to pass across this collaboration.

Figure 5E:
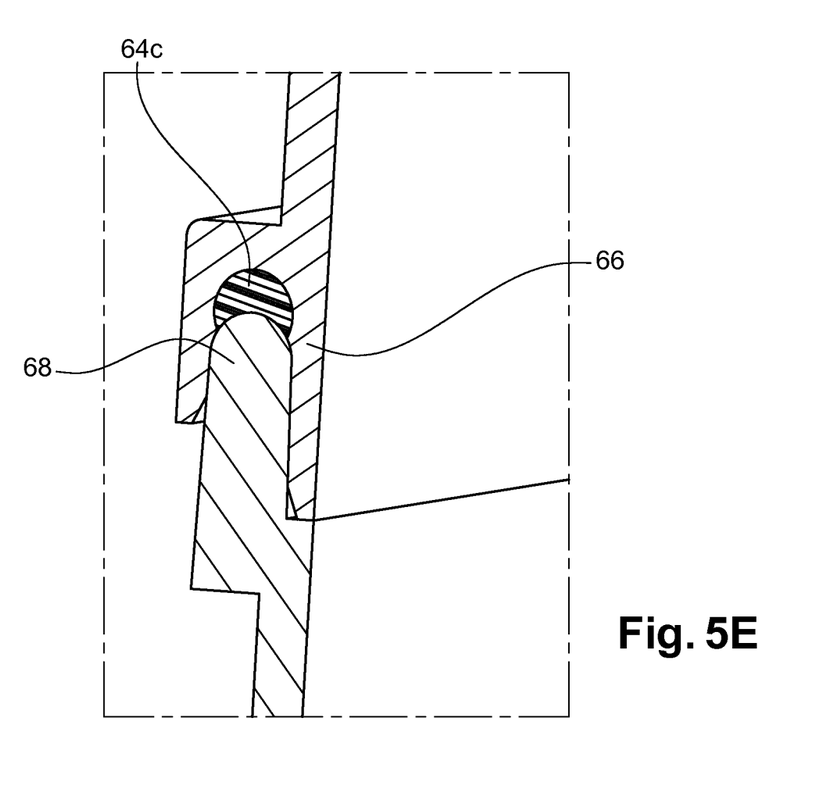

As illustrated in FIG. 5C, the sealing means 64 may correspond to an O-ring 64c arranged at the interface between two elements 2,2a, 2b,2a1,2a2,2b1,2b2,16,62 of the regulating device 1. For that, one of these elements, let us say the first element, may comprise a groove 66 in which the O-ring 64c is arranged, and the other element, let us say the second element, may come to bear directly against the O-ring 64c, the O-ring 64c deforms in such a way as to remain in contact with the second element 2, 2a, 2b, 2a1, 2a2, 2b1, 2b2, 16, 62, and the air stream is no longer able to pass across this collaboration. The O-ring 64c, which may be made of rubber or any other elastomer, is particularly well suited to sealing against air and against water. Of course, the second element may also comprise a protuberance 68 extending into the groove 66 and coming to bear against the O-ring 64c as illustrated in FIG. 5E.

As illustrated in FIG. 5B, the sealing means 64 may correspond to an overmolded lip seal 64b arranged at the interface between two elements 2, 2a, 2b, 2a1, 2a2, 2b1, 2b2, 16, 62 of the regulating device. For that, one of these elements, let us say the first element, may comprise a groove 66, and an overmolded lip seal 64b may be overmolded on the other element, let us say the second element, and come to bear directly against the bottom wall of the groove 66, namely against the first element, the overmolded lip seal 64b deforms in such a way as to remain in contact with the first element 2, 2a, 2b, 2a1, 2a2, 2b1, 2b2, 16, 62, and the air stream is no longer able to pass across this collaboration. The overmolded lip seal 64b, which may be made of rubber or any other elastomer (for example SEBS or polystyrene-b-poly(ethylene-butylene)-b-polystyrene), is particularly well suited to sealing against air and against water.

The flow duct 4 comprises an air inlet 20 and an air outlet 22, the latter being made up of at least two separate ducts, the flap, which will be described below, being capable of shutting off each of said ducts. The air outlet 22 of the flow duct 4 comprises a discharge duct 24 arranged to guide the air stream to the outside of the vehicle and a cooling duct 26 arranged to guide the air stream to the engine compartment of the vehicle. As shown in FIG. 3, the cooling duct 26 corresponds here to a duct in which an opening 28 provided with a grille 30 is made in a wall of the housing 2, thus allowing the air stream to flow from the flow duct 4 to the engine compartment. The discharge duct 24 corresponds here to a duct in which an opening 32 is made in a wall of the housing 2, thus allowing the air stream to flow from the flow duct 4 to the outside of the vehicle.

The device 1 for regulating an air stream according to the invention further comprises a flap 34 arranged within the flow duct 4 downstream of the cooling unit 6 relative to the flow of the air stream. The flap 34 is of the drum type as shown in FIG. 2 as, given that such a regulation device extends over a large part of the width of the vehicle (Y axis) and can thus reach more than one meter, the drum flap, due to its structure that offers improved mechanical strength, is better suited to such use. Other flaps can be envisaged, such as a sliding flap (also known as a sliding door) comprising a sliding door on which at least one rack is arranged and a toothed wheel that complements the rack, rotated about an axis by an actuator in order to move this flap, in particular in translation, according to an embodiment not shown.

The drum flap 34 comprises an axis of rotation 36 in the form of a shaft allowing the flap 34 to pivot. The drum flap 34 further comprises three solid walls. Two side walls 38 are arranged at the two opposite ends of the axis of rotation 36, these two side walls 38 being parallel and inscribed in a plane defined by the axes XZ perpendicular to the axis of rotation 36, and a transverse wall 40 connects the side walls together. The transverse wall 40 is inscribed in a plane defined by the axes XZ with a curved shape and allows the flow or stopping of the air stream in a duct 24,26 at the air outlet 22 of the flow channel 4 depending on the positioning thereof. The space between the side walls 38, the transverse wall 40 and the axis of rotation 36 is unoccupied so that the air stream is capable of passing between these elements as shown by the arrow F2 in FIG. 2.

The transverse wall 40 of the drum flap 34 is capable of shutting off the discharge duct 24 as shown in FIG. 2. The transverse wall 40 of the drum flap 34 is also capable of shutting off the cooling duct 26 according to an embodiment not shown.

The different walls of the flap 34 follow the shape of the walls of the housing 2 so as to provide proper sealing, and the flap 34 can furthermore also comprise elastomer lips 42 overmolded onto the ends of the walls. The wall of the housing 2 in which the cooling duct 26 is arranged is thus substantially rounded, so that the curved transverse wall 40 of the flap 34 can fully shut off this outlet duct.

When the vehicle is traveling, the flap 34 is arranged so that it shuts off the cooling duct 26, the air stream therefore passing through the discharge duct 24. When the vehicle is parked at a terminal (as the battery is being recharged), the flap 34 is arranged so that it shuts off the discharge duct 24 cooling duct 26, the air stream therefore passing through the cooling duct 26 as shown in FIG. 2. The flap 34 is capable of adopting any intermediate position.

Still according to the invention, the cooling unit 6 is inclined relative to the shut-off device 14. In other words, the mid-planes of the cooling unit 6 and of the shut-off device 14 form an angle other than 0° (non-zero), particularly an angle in an interval of 10° to 80°, more specifically in an interval of 30° to 60°. Such an arrangement makes it possible to reduce the spatial footprint of the regulation device 1.

Still according to the invention, it can be advantageous for fins 44 to be arranged upstream and/or downstream of the cooling unit 6 relative to the flow of the air stream. The fins 44 correspond to air guides in the form of rounded walls defining corridors for the air stream in order to distribute the air stream F1 (FIG. 2) over the entire surface of the heat exchangers 8, 10 of the cooling unit 6, resulting in improved thermal efficiency.

In order to improve this thermal efficiency, it is beneficial for the fins 44 to extend from the shut-off device 14 to the cooling unit 6. The fins 44 can for example extend the continuity of the shut-off flaps 18 of the shut-off device 14 when they are in the open configuration. The fins 44 can also be generally S-shaped with a leading edge corresponding to one end of the fin extending in a horizontal plane defined by the X and Y axes, a trailing edge substantially parallel to the leading edge but at a different height (Z) and an inclined section or ramp connecting the leading edge and the trailing edge that extends mainly along a vertical axis (Z). The invention is not limited to the shape of the fins 44 provided that they act as a guide for the air stream; the fins 44 can for example be in the shape of a quarter of a circle.

The first flat end part of the fin 44 suitable for being crossed by the air stream F1 corresponds to the leading edge and is flat. The second and last flat end part suitable for being crossed by the air stream F1 corresponds to the trailing edge and is also flat. The inclined section is not part of the leading and trailing edges.

The fins 44 extend between the shut-off device 14 and the cooling unit 6 without however being in contact with these elements. In order to better guide the air, the leading and trailing edges of the fins 44 are arranged close to the shut-off device 14 and to the cooling unit 6 respectively, without however abutting against these elements.

Still according to the invention, the flow section of the flow duct 4 widens from the air inlet 20 of the flow channel 4 to the cooling unit 6 and narrows from the cooling unit 6 to the air outlet 22 of the flow duct 4 in the direction of flow of the air stream. In other words, the flow section of the flow duct 4 has at least one dimension (width and/or height) that progressively increases along the length thereof, or as it draws closer to the cooling unit 6 starting from the air inlet 20, in the direction of flow of the air stream. Similarly, the flow section of the flow duct 4 has at least one dimension (width and/or height) that progressively decreases along the length thereof, or as it becomes further away from the cooling unit 6 going toward the air outlet 22, in the direction of flow of the air stream.

Still according to the invention, acoustic absorption components may be arranged within the housing 2, thus lining the flow duct 4 with acoustic insulation and eliminating or limiting the spread of noise toward the outside. The acoustic absorption component may for example correspond to a layer of open-cell or closed-cell polyurethane foam, preferably impregnated with a vinylidene copolymer, or else may correspond to a cavity operating like a Helmholtz resonator.

According to one embodiment which has not been illustrated, a motor vehicle comprises a bumper beam below which a grille or grating is positioned. This grille is fixed and remains in the open position to allow an incoming air stream to pass through. The vehicle according to the invention comprises an air inlet regulation device 1 as described above.

The motor vehicle according to the invention therefore comprises an air inlet provided with a grille and a device 1 for regulating this air inlet. The air outlet 22 of the flow duct 4 comprises a discharge duct 24 arranged to convey the air stream toward the outside of the vehicle and a cooling duct 26 arranged to convey the air stream toward the engine compartment of the vehicle.

The vehicle according to the invention can further comprise an additional inlet as well as an additional duct connecting said additional inlet to the discharge duct conveying the air stream to the outside of the vehicle. This makes it possible to accentuate the Venturi effect of the discharge duct, thus increasing the circulating-air flow rate, thus improving the thermal efficiency. The additional inlet can also be provided with a grating in order to prevent any foreign body (branches, leaves, etc.) from entering the additional duct.

It must be understood however that these embodiments are given by way of illustration of the subject matter of the invention. The invention is not limited to these embodiments described above and supplied by way of example only. It encompasses various modifications, alternative forms and other variants that a person skilled in the art can envisage within the scope of the present invention, and in particular any combination of the different embodiments described above.

The invention claimed is:

1. A device for regulating an air stream for an air inlet of a motor vehicle, comprising:
   a housing defining a flow duct comprising an air inlet and an air outlet,
   wherein an air stream flows in the flow duct,
   wherein a cooling unit comprising at least one heat exchanger and a motor-fan unit is at least partially arranged in the housing,
   wherein the housing comprises at least one sealing means to prevent any air from leaking out of the flow duct,
   wherein the air outlet comprises at least two separate outlet ducts; and
   at least one flap to shut off each of the at least two separate outlet ducts of the air outlet individually.

2. The regulating device as claimed in claim 1, wherein the at least one sealing means corresponds to an O-ring, to an overmolded lip or to a foam strip.

3. The regulating device as claimed in claim 1, wherein the at least one sealing means is airtight and/or watertight.

4. The regulating device as claimed in claim 1, wherein a shut-off device comprising a set of shut-off flaps capable of pivoting rotatably so that they vary the flow rate of the air stream, is arranged in the flow duct upstream of the cooling unit relative to the flow of the air stream.

5. The regulating device as claimed in claim 4, wherein the cooling unit is inclined relative to the shut-off device.

6. The regulating device as claimed in claim 1, wherein the housing comprises a first part arranged upstream of the support frame and a second part arranged downstream of the support frame, the at least one sealing means being arranged between the support frame and each part.

7. The regulating device as claimed in claim 1, wherein the housing or each part of the housing is made up of two half-housings which together form said flow duct, the at least one sealing means being arranged between each half-housing.

8. The regulating device as claimed in claim 1, wherein the at least one sealing means is arranged between the shut-off device and the housing.

9. A motor vehicle comprising:
   an air inlet; and
   a regulation device for said air inlet comprising:
      a housing defining a flow duct comprising the air inlet and an air outlet,
      wherein an air stream flows in the flow duct, and
      a cooling unit comprising at least one heat exchanger and a motor-fan unit that is at least partially arranged in the housing,
      wherein the housing comprises at least one sealing means to prevent any air from leaking out of the flow duct,
      wherein the air outlet comprises at least two separate outlet ducts, and
      wherein the regulation device further comprises at least one flap to shut off each of the at least two separate outlet ducts of the air outlet individually.

\* \* \* \* \*